United States Patent
Emond et al.

(10) Patent No.: US 8,270,358 B2
(45) Date of Patent: Sep. 18, 2012

(54) SYSTEM AND METHOD FOR TRANSMITTING OVER MULTIPLE SIMULTANEOUS COMMUNICATION NETWORKS BY USING ROAMING PROFILES

(75) Inventors: Germain Emond, Boucherville (CA); Nicolas Lizotte, Kirkland (CA); Marc Groleau, Montreal (CA)

(73) Assignee: Radio IP Software Inc., Montreal (CA)

( * ) Notice: Subject to any disclaimer, the term of this patent is extended or adjusted under 35 U.S.C. 154(b) by 308 days.

(21) Appl. No.: 12/686,055

(22) Filed: Jan. 12, 2010

(65) Prior Publication Data
US 2010/0177754 A1  Jul. 15, 2010

Related U.S. Application Data

(60) Provisional application No. 61/144,010, filed on Jan. 12, 2009.

(51) Int. Cl.
*H04W 4/00* (2009.01)
(52) U.S. Cl. .......................... 370/329; 370/338; 370/341
(58) Field of Classification Search .................. None
See application file for complete search history.

(56) References Cited

U.S. PATENT DOCUMENTS

| 6,219,706 | B1 | 4/2001 | Fan et al. | |
|---|---|---|---|---|
| 6,609,148 | B1 | 8/2003 | Salo et al. | |
| 6,778,517 | B1* | 8/2004 | Lou et al. | 370/338 |
| 7,042,855 | B1* | 5/2006 | Gilchrist et al. | 370/328 |
| 7,539,175 | B2* | 5/2009 | White et al. | 370/350 |
| 8,081,968 | B2* | 12/2011 | Lauer et al. | 455/430 |
| 8,107,457 | B2* | 1/2012 | White et al. | 370/350 |
| 2009/0296599 | A1* | 12/2009 | Ayyagari et al. | 370/253 |
| 2011/0122886 | A1* | 5/2011 | Willars et al. | 370/412 |

FOREIGN PATENT DOCUMENTS
WO  02/05493 A2  1/2002

* cited by examiner

*Primary Examiner* — Chi Pham
*Assistant Examiner* — Soon-Dong D Hyun
(74) *Attorney, Agent, or Firm* — Goudreau Gage Dubuc; Hugh Mansfield

(57) ABSTRACT

There is disclosed a system and method for enabling transmission of data between an application pair, a first one of the applications in a nomadic/mobile subsystem and a second one of the applications in a ground subsystem comprising a first router within the nomadic/mobile subsystem, the first router interconnected with the first application, a second router within the ground subsystem, the second router interconnected with the second application, and a secure data transfer tunnel established between the first router and the second router, the tunnel comprising a plurality of communication pipes, each one of the plurality of pipes having associated therewith one of a plurality of different communication networks and at least one filtering rule dictating circumstances under which the pipe can be used to transmit data. When at least one attribute of the data to be transmitted matches the at least one filtering rule of a matching one of the plurality of pipes, the transmission of the data between the application pair is assigned to the matching pipe. In a particular embodiment each of said different communication networks comprises a network driver, and each of said plurality of pipes further comprises a roaming profile consisting of a set of rules defining how the pipe can transmit and receive data packets from at least one of said network drivers.

17 Claims, 7 Drawing Sheets

FIG_4

SYSTEM AND METHOD FOR TRANSMITTING OVER MULTIPLE SIMULTANEOUS COMMUNICATION NETWORKS BY USING ROAMING PROFILES

CROSS-REFERENCE TO RELATED APPLICATIONS

This application claims benefit, under 35 U.S.C. §119(e), of U.S. provisional application Ser. No. 61/144,010, filed on Jan. 12, 2009. All documents above are incorporated herein in their entirety by reference.

FIELD OF THE INVENTION

The present invention relates to the use of a tunnel to provide for critical communications in a nomadic/mobile communication system. In particular, multiple simultaneous networks using roaming profiles are implemented within the tunnel.

BACKGROUND OF THE INVENTION

When law enforcement, fire, emergency medical services or other emergency management are confronted with an incident, reliability of communications is mission critical. Indeed, there is a need to have the right information at the right time and from the right people. Communications, both between the command post and the dispatch center, as well as traffic between participants on-scene, becomes highly important to ensure that all participants are up to date and prepared when they arrive on the scene.

For this purpose, critical networks, which are created specifically for public safety organisations unlike commercial networks designed for the general public, provide the information security and reliability that responders require, especially during a crisis. Such networks are built for high reliability and large area coverage, thus reducing overall speed, and ensuring that an interconnection is always available to keep safety officers and the like in contact and up-to-date with vital information related to the incident. In particular, sensitive or "mission critical" data is typically delivered to users on such a reliable, secure critical networks. This information is can be shared by all responders who can benefit from its collective value, whether they are on the front line or in the control room.

One major drawback of such networks, however, is that they typically use narrow band, with a resulting transmission speed below 19200 bits-per-second. This limited bandwidth is a serious drawback when trying to implement newer software solutions which typically have much higher requirements vis-à-vis the speed of connections in order to download, for example, static information such as maps or software updates and the like. It is therefore highly desirable to use higher speed networks, such as a public 3G cellular or broadband (WiFi) networks. However, commercial public networks are typically not as secure and reliable as private networks, especially in crisis situations where public networks are often flooded by users trying to reach their relatives, up load video and photographs of the incident, or the like.

Although one prior art solution involves the use of mobile VPN solutions, which allow roaming between networks depending on availability, such solutions are limited to roam all the traffic from every application at the same time to the same network. As a result, only the one communication network is usable at a given time and another issue arises, namely that applications requiring higher speed networks create congestion when roaming to a lower speed network. Although using special IP filters can partially address this problem, many data packets from applications with high communication requirements, which might have been queued for transmission, are typically required to be acknowledged by the receiving peer to keep the VPN connection synchronized. Another problem is that critical data communications can potentially roam to an unsecured public network in order to allow applications requiring faster data transfer to be usable. Still, even with a VPN tunnel, public safety agencies are required to ensure that the critical information will safely reach the recipient without any corruption and interception by a third party.

What is therefore needed, and one object of the present invention, is a system that creates a single secured tunnel while using multiple communication networks at the same time, such that each application can be assigned to a communication pipe and critical applications use the most secure and reliable network, even at lower speed, while applications requiring higher data speed transfer use public communication networks.

SUMMARY OF THE INVENTION

In order to address the above and other drawbacks, there is provided in accordance with the present invention a system for enabling transmission of data between an application pair, a first one of the applications in a nomadic/mobile subsystem and a second one of the applications in a ground subsystem. The system comprises a first router within the nomadic/mobile subsystem, the first router interconnected with the first application, a second router within the ground subsystem, the second router interconnected with the second application, and a secure data transfer tunnel established between the first router and the second router, the tunnel comprising a plurality of communication pipes, each one of the plurality of pipes having associated therewith one of a plurality of different communication networks and at least one filtering rule dictating circumstances under which the pipe can be used to transmit data. When at least one attribute of the data to be transmitted matches the at least one filtering rule of a matching one of the plurality of pipes, the transmission of the data between the application pair is assigned to the matching pipe.

There is also provided a method for enabling data transmission between a pair of applications, a first one of the applications in a nomadic/mobile system and a second one of the applications in a ground system. The method comprises providing a tunnel between the nomadic/mobile system and the ground system, the tunnel comprised of a plurality of communication pipes, each one of the plurality of pipes having associated therewith one of a plurality of different communication networks and at least one filtering rule, at the tunnel, receiving data for transmission between the application pair, the data having at least one data attribute, selecting an appropriate one of the pipes for transmitting the data between the application pair by matching the at least one filtering rule and the at least one data attribute, and transmitting the data between the given pair using the selected pipe.

DETAILED DESCRIPTION OF THE ILLUSTRATIVE EMBODIMENTS

Figure 1:
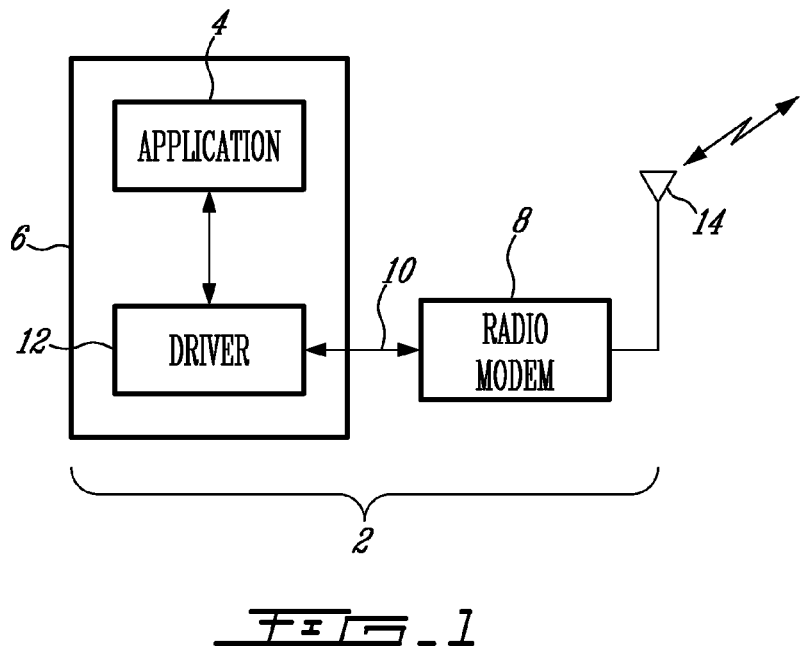
FIG. 1 is a functional model of a prior art mobile system.

Referring now to FIG. 1, a functional model of a mobile system, generally referred to using the reference numeral 2, is disclosed. The mobile system 2 is comprised of a mobile application 4, for example in the form of a software application loaded into the memory of a portable terminal 6 (for example, a general purpose computer, a mobile data terminal or PDA), which communicates with a wireless modem 8 via an interface 10, for example an RS-232 interface, and driver software 12. The wireless modem 8 is typically located in proximity to the portable terminal 6 within which the application 4 is housed. The wireless modem 8 receives commands and data via the interface 10 from the application 4 which it transmits to other participants in the mobile network (not shown) via an antenna 14. Similarly, transmissions from other participants received at the antenna 14 are decoded by the wireless modem 8 for subsequent transferral to the application 4 via the interface 10.

Figure 2:
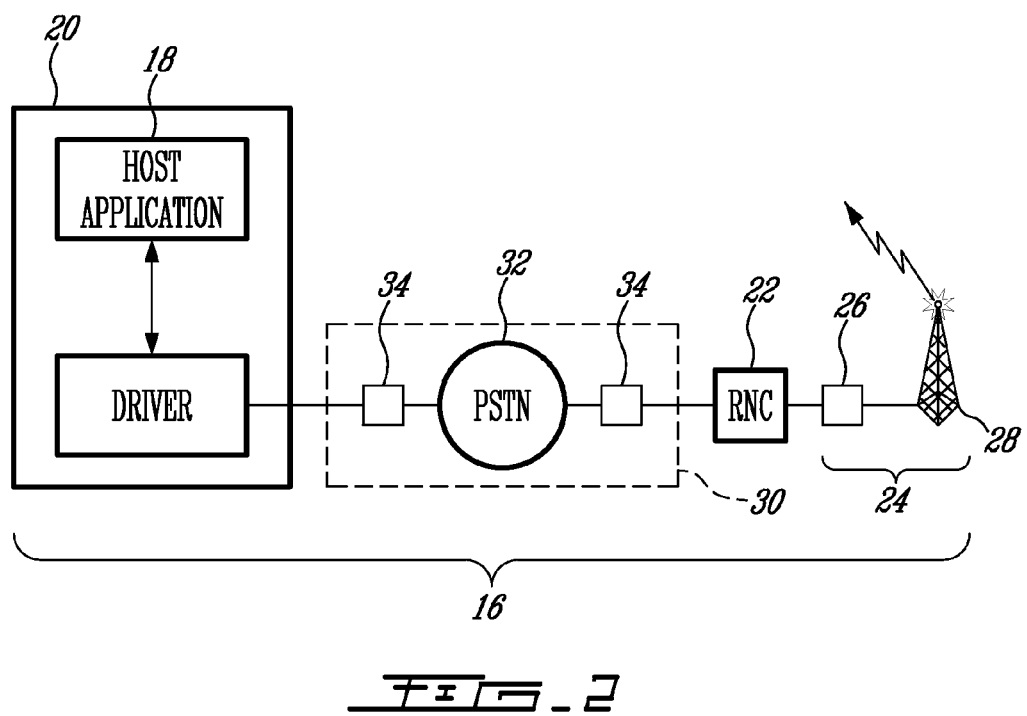
FIG. 2 is a perspective view of a functional model of a prior art fixed system.

Referring now to FIG. 2, a functional model of a ground system, generally referred to using the reference numeral 16, is disclosed. The ground system 16 is comprised of at least one fixed host application 18, for example in the form of a software application loaded into the memory of a host computer 20, which transfers data and control information, via a Radio Network Controller 22 (RNC), to and from one or more base stations 24, comprised of at least one base station controller 26 and antenna 28. As the base station 24 is typically at a location remote to the host computer 20 (for example, a general purpose computer) which houses the host application 18, transfer of the control information is between the host computer 20 and the base station 24 and communication system 30 to be interposed, for example through a leased line on a Packet Switched Telecommunications Network (PSTN) 32, async, bisync, or, more commonly, X.25 dedicated circuits. Additionally, the RNC 22 is typically connected in the prior art to a plurality of base stations 24. Both the host computer 20 and the base station 24 are attached to the PSTN 32 via a modem 34 as is well known in the art. The base station controller 26 exchanges data with mobile systems 2 (as described hereinabove) via the antenna 28.

Referring now to FIG. 1 in addition to FIG. 2, a typical two-way radio dispatch system consists of a fixed ground system 16, such as an operating centre controlling the operation of a fleet of remote users, such as vehicles (e.g. taxis, police cars, trucks) and the like. In order to provide coverage over a large area, a typical ground system 16 will communicate with the fleet via a large number of deployed base stations as in 24, each comprised of at least one base station controller 26 and antenna 28. Each remote user accesses the ground system 16 from a mobile system 2 such as a laptop terminal (not shown), which communicates with a base station 24 to open a data channel (not shown) with the ground system 16 in order to access or exchange critical information (e.g. wildland fire, missing child, mass casualty event or other emergency). For this purpose and in accordance with an illustrative embodiment of the present invention, communications between mobile systems as in 2 and the ground system 16 are illustratively provided by a multi-network system comprising a plurality of communication networks (not shown) and a data channel opened between two peers (mobile system 2, ground system 16) may roam between the plurality of networks using different roaming rules. In this manner and using a plurality of roaming rules, multiple data channels may be active simultaneously, as will be discussed in further detail herein below.

Still referring to FIG. 1 and FIG. 2, a cost efficient high speed data channel and a low speed "mission critical" data channel (none shown) are illustratively provided. The high speed channel illustratively has low reliability and uses a plurality (illustratively two (2)) of networks (e.g. WiFi, LAN, 3G, etc.) to carry the bulk of the "non mission critical" communications data (e.g. software updates, file sharing) between the remote user's mobile system 2 and the ground system 16. The low speed channel on the other hand illustratively has high reliability and uses a plurality (illustratively three (3)) of networks (e.g. Tetra, DataTAC™, etc.) to carry sensitive or "mission critical" communications. In the event of a failure of the high speed channel and associated networks, automatic rerouting of "non mission critical" communications illustratively takes place in order to direct some of the high speed traffic onto the low speed channel and associated networks, and vice versa, as will be discussed further herein below.

The DataTAC™ network is illustratively implemented as the ARDIS™ system, which uses an operating frequency band of 800 MHz. RF links use separate transmit and receive frequencies, 45 MHz apart, that are simultaneously used to form a full-duplex channel. The ARDIS™ system typically implements two protocols in the RF-channel, MDC-4800 and RD-LAP (or Radio Data-Link Access Procedure) and as such, supports primarily two-way mobile data communications for short length radio messages in urban and in-building environments, and for users travelling at relatively low speeds. RD-LAP is a protocol for supporting land mobile data communication networks. The network enables the transfer of data among subscribers, typically from users in the field to a dispatch or command center or from one user in the field to another. RD-LAP provides for data rates of up to 19,200 bits per second between a base station 24 and a mobile system 2. In the physical channel, Gaussian Frequency Shift Keying (GFSK) has been implemented as the modulation technique.

Typically, in the ARDIS™ system base station power is approximately 40 Watts, which provides line-of-sight coverage up to a radius of 10 to 15 miles. On the other hand, the mobile systems 2 operate with 4 Watts of radiated power. The areas covered by the individual base stations overlap to increase the probability a signal from a mobile system 2 to reach at least one base station 24. Illustratively, the ARDIS™ system has approximately 1400 base stations as in 24 occupying 1100 cell sites.

Figure 3:
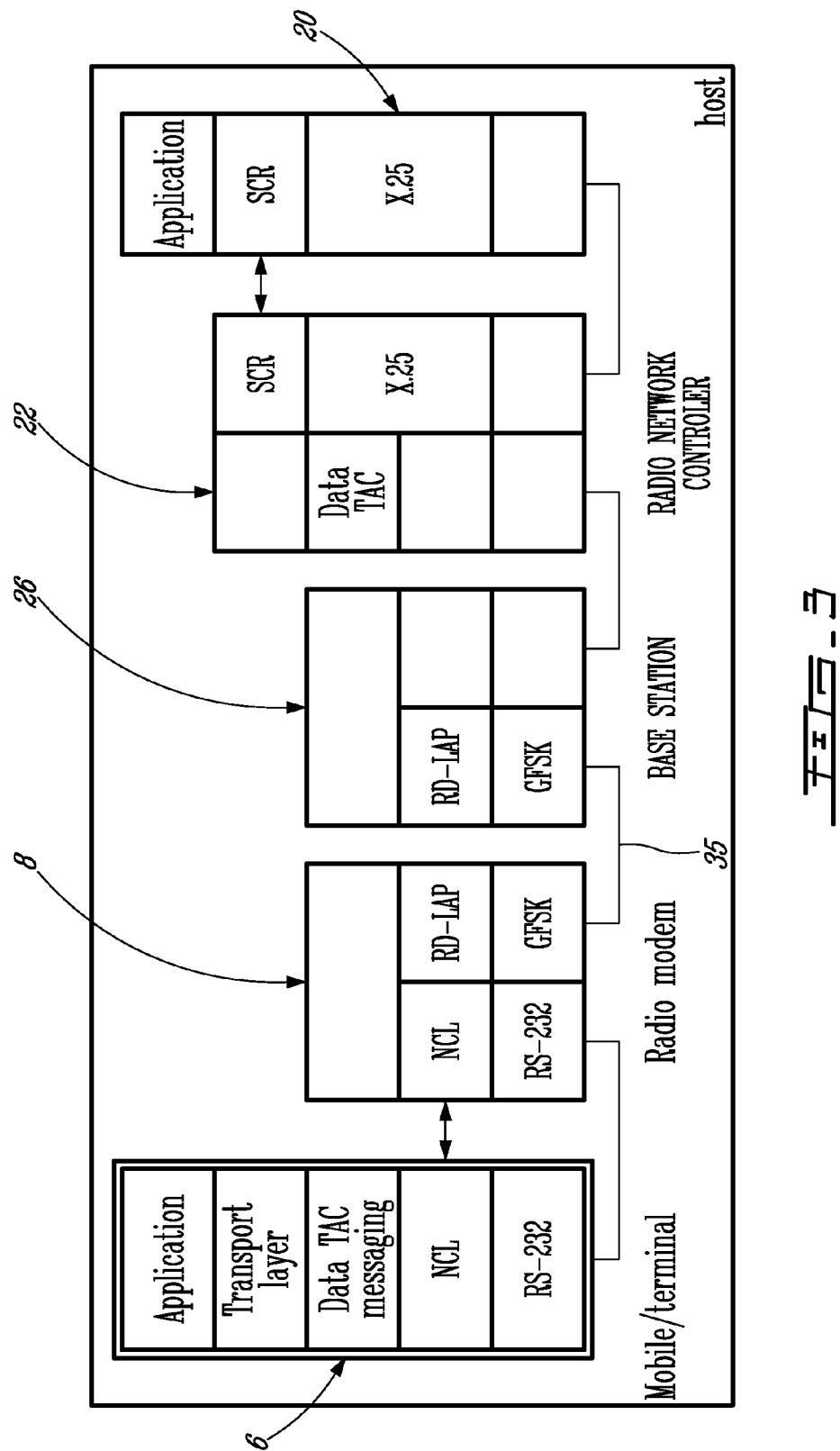
FIG. 3 is a layered conceptual model of a prior art wireless network.

Referring now to FIG. 3, a conceptual model of a communication system based on the DataTAC™ network is disclosed. This conceptual model takes advantage in part of the Open Systems Interconnection (OSI) reference model. As is well known in the art, the OSI reference model is a hierarchical structure of layers that defines the requirements for communications between two computers as defined by the International Standards Organization (ISO). Its primary benefit is to allow interoperability across the various platforms offered by different vendors. Supporting the model are an extensive pallet of performance and interfacing standards. The interoperability of devices adhering to the same set of standards is ensured, thereby allowing diverse network elements to interoperate, regardless of the manufacturer, provided they subscribe to the same standard sets.

The DataTAC™ network provides data communications between a portable terminal 6 and a host computer 20 via a wireless connection 35. The wireless connection is set up between a wireless radio modem 8/BASE STATION radio network controller (RNC) 26 pair using the RD-LAP protocol as discussed hereinabove running over GFSK as modulation technique.

In a prior art embodiment, the mobile terminal 6 is interconnected with the wireless radio modem 8 via an RS-232 interface over which Native Command Language (NCL) is exchanged. As is known to persons of skill in the art, in the DataTAC™ system, NCL is the device link protocol by which the mobile terminal 6 can communicate with the wireless radio modem 8 in order exchange control information and transfer data which was received by or is to be sent by the wireless radio modem 8. In this prior art embodiment the wireless radio modem 8 is also accessible via a Hayes compatible interface and the well known AT command set.

It will be apparent now to a person of ordinary skill in the art that, in the prior art, the mobile terminal 6 is typically located in proximity to the wireless radio modem 8 (or alternatively, the wireless radio modem 8 is incorporated in the mobile terminal 6 as a sub component).

Figure 4:
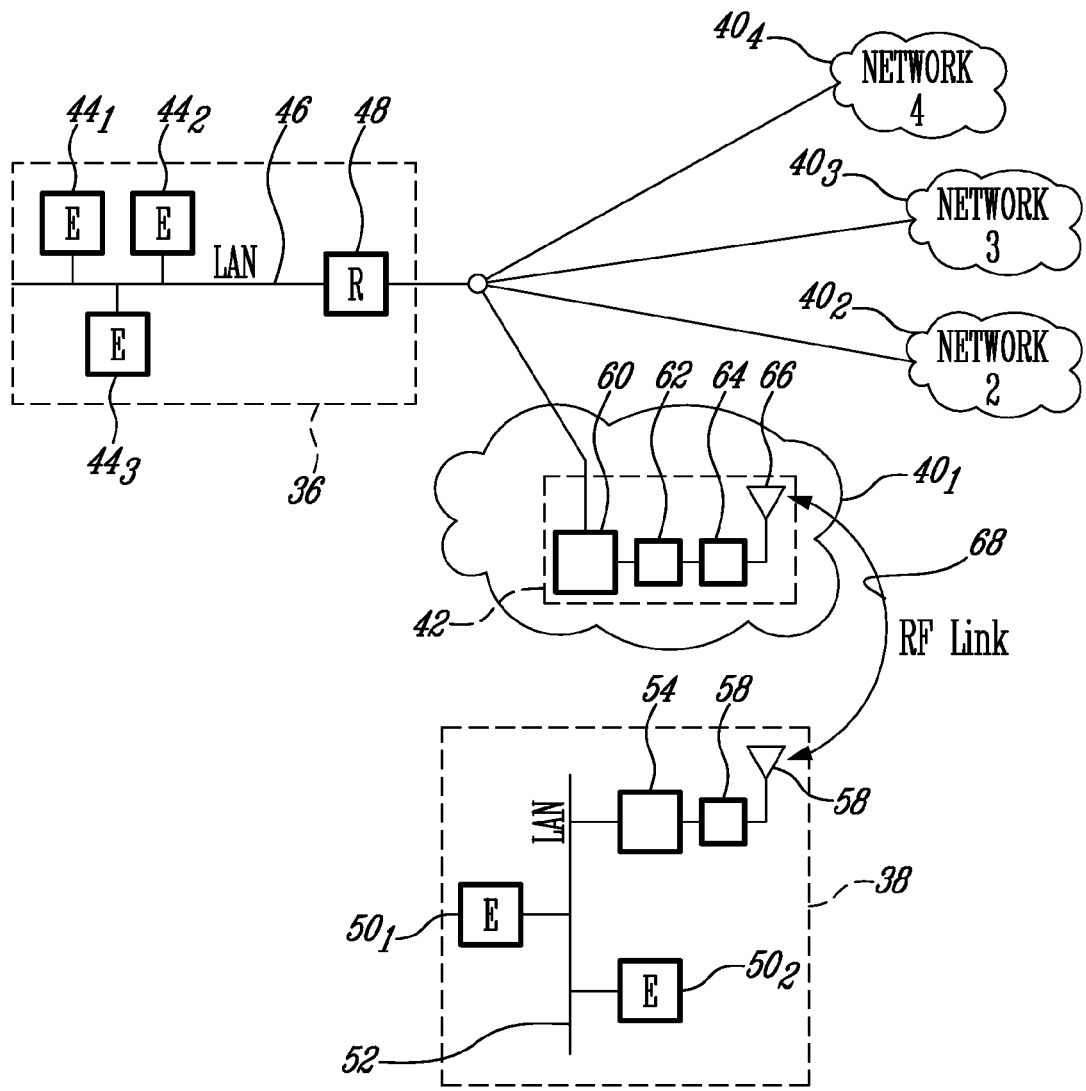
FIG. 4 is a schematic diagram of a critical communications network in accordance with an illustrative embodiment of the present invention.

Referring now to FIG. 4, a communications system in accordance with an illustrative embodiment of the present invention will now be described. The system comprises at least one ground subsystem 36 that is interconnected with at least one mobile, or nomadic, system 38 via one of a plurality (illustratively four (4)) of networks as in $40_1$, $40_2$, $40_3$, and $40_4$, each comprised of at least one ground station 42. The communication networks as in $40_1$, $40_2$, $40_3$, and $40_4$ could include, for example, terrestrial mobile networks such as cellular telephone networks, WiFi, and the above described DataTAC™ as well as mobile satellite networks. Additionally, from time to time the communication networks as in $40_1$, $40_2$, $40_3$, and $40_4$ interconnecting the nomadic/mobile subsystem 38 and the ground subsystems 36 could also include one or more wired networks. Examples of nomadic/mobile subsystems 38 could include larger systems, such as ships, aircraft and vehicles comprising their own on board local networks (not shown), but might also include in a simple embodiment a nomadic/mobile computer such as a WiFi enabled notebook, or the like (also not shown).

Still referring to FIG. 4, each ground subsystem 36 is comprised of one or more end systems as in $44_1$, $44_2$, $44_3$, interconnected by a LAN 46 or the like. It will be understood that the LAN 46 can be based on a number of different types of networking technologies alone or in combination, for example the ubiquitous Ethernet (IEEE 802) supported by twisted pair conductors (IEEE 802.3), FDDI, Token Ring or wireless technologies such as IEEE 802.11, BlueTooth™ and the like. Access to the network $40_1$ via the LAN 46 is provided via a Router 48. As is well known in the art, routers forward packets of data marked with an appropriate destination address either to the end system having that destination address or to another router which is closer to the end system having that destination address.

Similar to the ground subsystem 36, each nomadic/mobile subsystem 38 is comprised of one or more end systems as in $50_1$, $50_2$ interconnected by a LAN 52 or the like. Again, it will be understood that the LAN 52 can be based on a number of different types of networking technologies as discussed hereinabove. Access from the nomadic/mobile subsystem 38 to the ground station 42, and thus to the network $40_1$, is provided via a remote client side router 54 connected to the LAN 52 and a radio modem 56/antenna 58 pair.

Still referring to FIG. 4, each ground station 42 is illustratively comprised of a server side router 60 interconnected via a Radio Network Controller (RNC) 62 with at least one base station 64/antenna tower 66 pair. In order to provide the nomadic/mobile subsystem 38 access to the end systems such as $44_1$, $44_2$, $44_3$ over the desired network $40_1$, an RF link 68 is established between the nomadic/mobile subsystem 38 and the ground station 42 of the network $40_1$. As stated above, in an illustrative embodiment the RF link 68 is based on RD-LAP with GFSK modulation providing the signaling in the physical channel.

Figure 5:
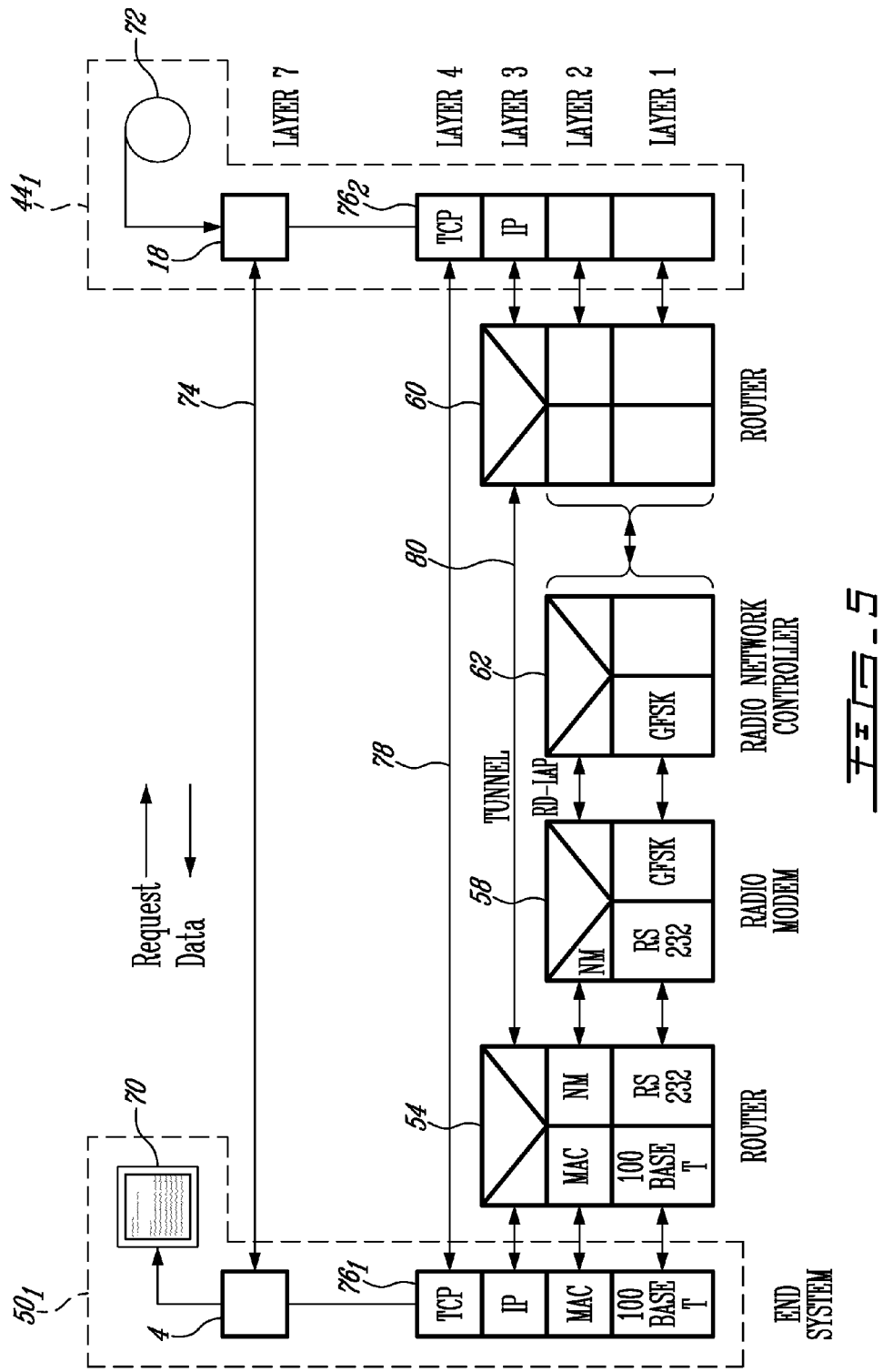
FIG. 5 is a layered conceptual model of the critical communications network of FIG. 4.

Referring now to FIG. 5 in addition to FIG. 4, a conceptual model of an illustrative embodiment of the present invention will be described. As in the above, this conceptual model takes advantage in part of the Open Systems Interconnection (OSI) reference model. In particular, although not conforming 100% to the OSI reference model, the present illustrative embodiment includes reference to TCP/IP, the fundamental protocol for transferring data via the Internet, which applies only a subset of the whole OSI model (in large part only layers 1 through 4).

Still referring to FIG. 5 in addition to FIG. 4, in order for a (in this case mobile) peer or end-system $50_1$, in the form of a client application 4 (for example an application for displaying data on a terminal 70 and defining a set of parameters used to identify the local peer), to communicate with a remote (in this case fixed) peer or end-system $44_1$, in the form of a server application 18 (for example an application for retrieving data from a data bank 72), a data channel 74 is set up and maintained between the client application 4 and the application server 18 taking advantage of the transport layers as in $76_1$, $76_2$, and in particular TCP/IP (e.g. TCP, UDP, or the like), although other protocols, for example those conforming to ISO 8073 or other proprietary protocols, could be used. Illustratively, an application 4, 18 may be identified by the IP protocol it uses. Also, while for a local peer (e.g. a personal computer), the name of the client application 4 (i.e. an executable path) may be used, for a remote peer, the server application 18 may be identified by its destination IP address and port.

Still referring to FIG. 5 in addition to FIG. 4, the present invention advantageously enables for the data channel(s) 74 to be opened between the peers for transporting data over the multiple communication networks as in $40_1$, $40_2$, $40_3$, and $40_4$. Roaming rules between the networks as in $40_1$, $40_2$, $40_3$, and $40_4$ may be assigned to specific applications as in 4, 18 so that a client application 4 may, for instance, use the communication network $40_1$ to communicate with the server application 18 while other client applications as in 4 (not shown) use another communication network as in $40_2$, $40_3$, and $40_4$ at the same time, as will be discussed further herein below. It then becomes possible to control the flow of data, thus advantageously enabling mission critical information to be transported on mission critical networks only, whereas non critical information is transported on any other network.

Still referring to FIG. 5, the client and server applications 4, 18 receive data and control information from the transport layers as in $76_1$, $76_2$ with data received from the client application 4 illustratively relayed to the server application 18 via a unique logical connection 78 of a given protocol type, for example a transport connection established between the transport layers $76_1$, $76_2$.

To provide reliable transport services and as will be discussed further herein below, transport layers $76_1$, $76_2$ may establish a connection-oriented session with one another. For example, in the event that the transport layer $76_1$ in the mobile end system $50_1$ wishes to establish a connection with the transport layer $76_2$ in the ground end system $44_1$, it does so by first sending a connection request packet to the ground transport layer $76_2$. The ground transport layer $76_2$ replies by acknowledging the connection request. Once the acknowledgement is received by the mobile transport layer $76_1$, the connection 78 is established and data transfer can begin.

Still referring to FIG. 5, the connection 78 illustratively provides information related to the connected end-systems as in $44_1$, $50_1$ and the corresponding machines (not shown) from unique identifiers associated therewith, a listing of all established connections as in 78, as well as general data related to the traffic within the overall system. In particular, in order to establish a secure connection between the client application 4 and the server application 18, it is desirable for the mobile end system $50_1$ to illustratively provide appropriate authentication information to the ground end system $44_1$ by using the remote client side router 54 and the server side router 60.

Still referring to FIG. 5, in a preferred embodiment of the present invention, the remote client side router 54 sends a control message in the form of a registration request containing authentication information to initiate a secure interconnection, or secure tunnel 80, between remote client side router 54 and server side router 60. Such authentication information typically contains a unique identifier of the remote client side router 54 as used by the mobile end system $50_1$, mainly composed of a digital certificate serial number, and machine-related information such as the actual virtual IP address information, machine name, and any other machine-related information (e.g. Operating System information) that may be useful to system administrators. In order to increase the level of security, machine-related information may optionally be encrypted by the remote client side router 54 prior to transmission using an encryption cipher, which is preferably different for each newly established tunnel 80. It is also understood that a mobile end system as in $50_1$ uses only one remote client side router 54, thus having only one secure tunnel 80 established at a time.

Figure 6:
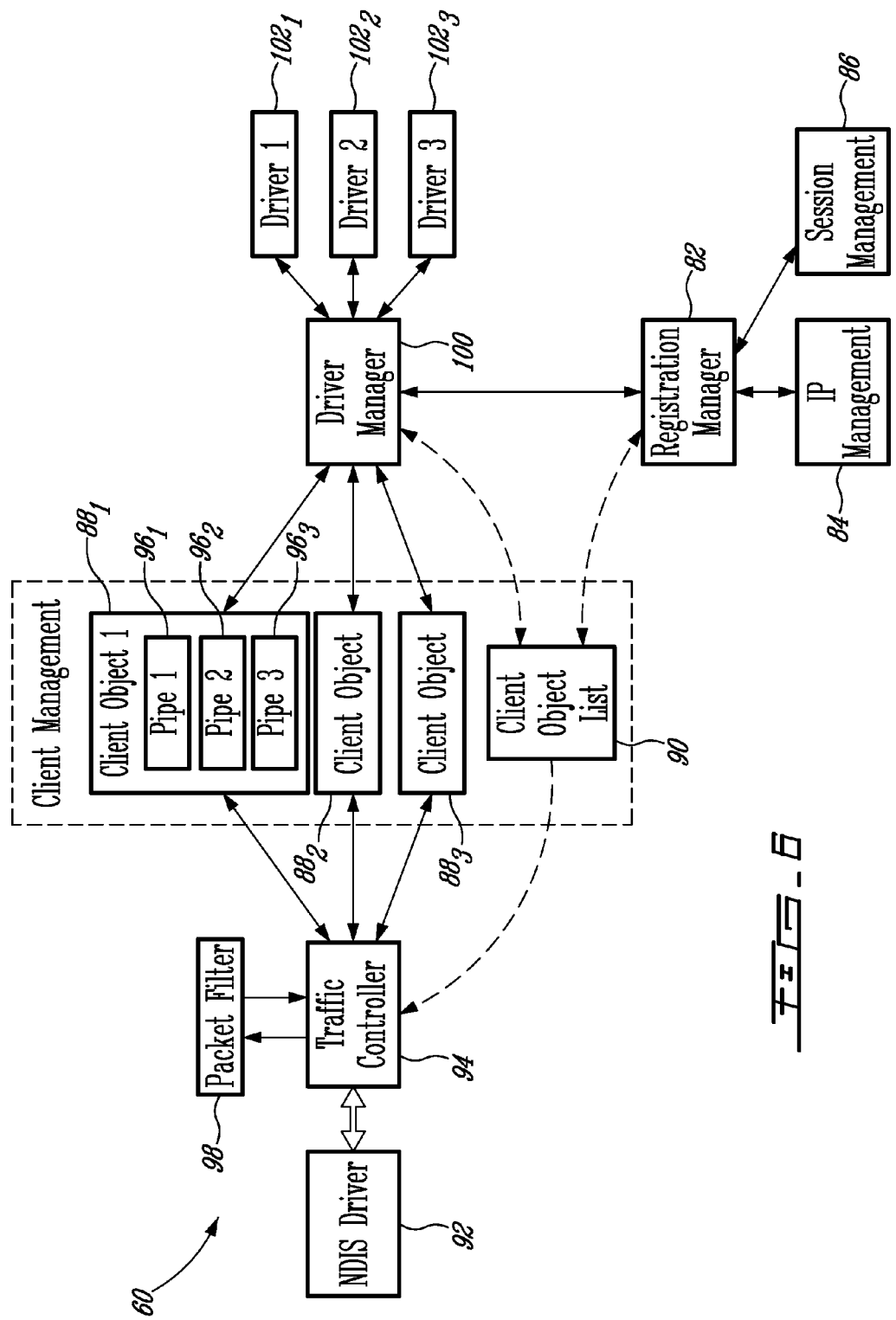
FIG. 6 is a schematic diagram of a server of the critical communications network of FIG. 4 in accordance with an illustrative embodiment of the present invention.

Referring now to FIG. 6 in addition to FIG. 5, in order to establish and maintain the tunnel, as well as manage data traffic between end-systems as in $44_1$, $50_1$, the server side router 60 illustratively comprises a Client Registration Manager 82 which communicates with an IP Management module 84, and a Session Management module 86 for processing the remote client's registration request. In particular, upon receiving the remote client's registration request, the server side router 60 decodes the request, which it dispatches to the Client Registration Manager 82 for further processing. The Client Registration Manager 82 then optionally decrypts the machine authentication identification (if encrypted) received from the remote client side router 54 using the same encryption mechanism as the one used by the remote client side router 54 for encryption. The authentication information is then used to validate whether the client's machine is entitled to establish a secure tunnel 80 with the server side router 60. If so, a client object as in $88_1$ (i.e. a logical representation of the status of the remote client side router 54 in the server side router 60) matching the provided machine authentication is retrieved with the certificate serial number being used to uniquely identify the remote client side router 54. As discussed herein above, as a plurality of mobile end-systems as in $50_1$, $50_2$ may wish to communicate with a plurality of ground end-systems as in $44_1$, $44_2$, $44_3$ over the plurality of networks (references $40_1$, $40_2$, $40_3$, $40_4$ in FIG. 4) with each mobile end-system as in $50_1$ using a single remote client side router 54 for this purpose, it will be apparent that a plurality of client objects as in $88_1$, $88_2$, $88_3$ may be provided to represent the status of the different remote client side routers as in 54 used by the various mobile end-systems as in $50_1$, $50_2$. Each tunnel 80 is illustratively uniquely identified using a session identifier and a serial number or cookie.

Still referring to FIG. 6 in addition to FIG. 5, the Client Registration Manager 82 passes the client IP information to an IP Management module 84, which keeps track of which remote client side router 54 uses which IP address, and if required, may also provide a new IP address to the remote client side router 54 if the latter uses, for example, Dynamic Host Configuration Protocol (DHCP). Address assignation may be done locally (i.e. by the server 18 itself) or externally (i.e. using an external DHCP server, not shown). In the latter case, the IP Management module 84 acts as a DHCP relay. Once the client's IP address is validated, the resulting IP information is also returned to the remote client side router 54. The Client Registration Manager 82 also provides the client object $88_1$ to a Session Management module 86, which optionally uses an encryption mechanism to encrypt all the information transported by the tunnel 80 between the remote client side router 54 and the server side router 60.

As a result of the above-mentioned process, a control message of type Registration Response is returned to the remote client side router 54, the Registration Response containing all the information returned by each module, namely the session identifier, IP information from the IP Management module 84 and optionally encryption information by the Session Management module 86. The Registration Response is then packaged by the Client Registration Manager 82 and optionally encrypted using the remote client's encryption mechanism, for example in order to avoid "Middle-man" attacks or the like. A tunnel 80 can therefore be established between the remote client side router 54 and the server side router 60.

Still referring to FIG. 6 in addition to FIG. 5, a lookup table or client object list 90 providing an association between the remote client's unique identifier, the client object $88_1$ and the physical communication network identifier is illustratively continuously maintained. This table 90 advantageously provides a fast indexing detailing which remote client side router 54 uses which communication network(s) (references $40_1$, $40_2$, $40_3$, and $40_4$ in FIG. 4) with which network identifier, such a network identifier being the physical address or modem identifier used by a communication network as in $40_1$ to identify the client's communication device (reference 2 in FIG. 1). As known in the art, the network identifier is the IP address in IP networks while it is the modem's Logical Link Identifier (LLI) on DataTAC™ systems described herein above.

Figure 7:
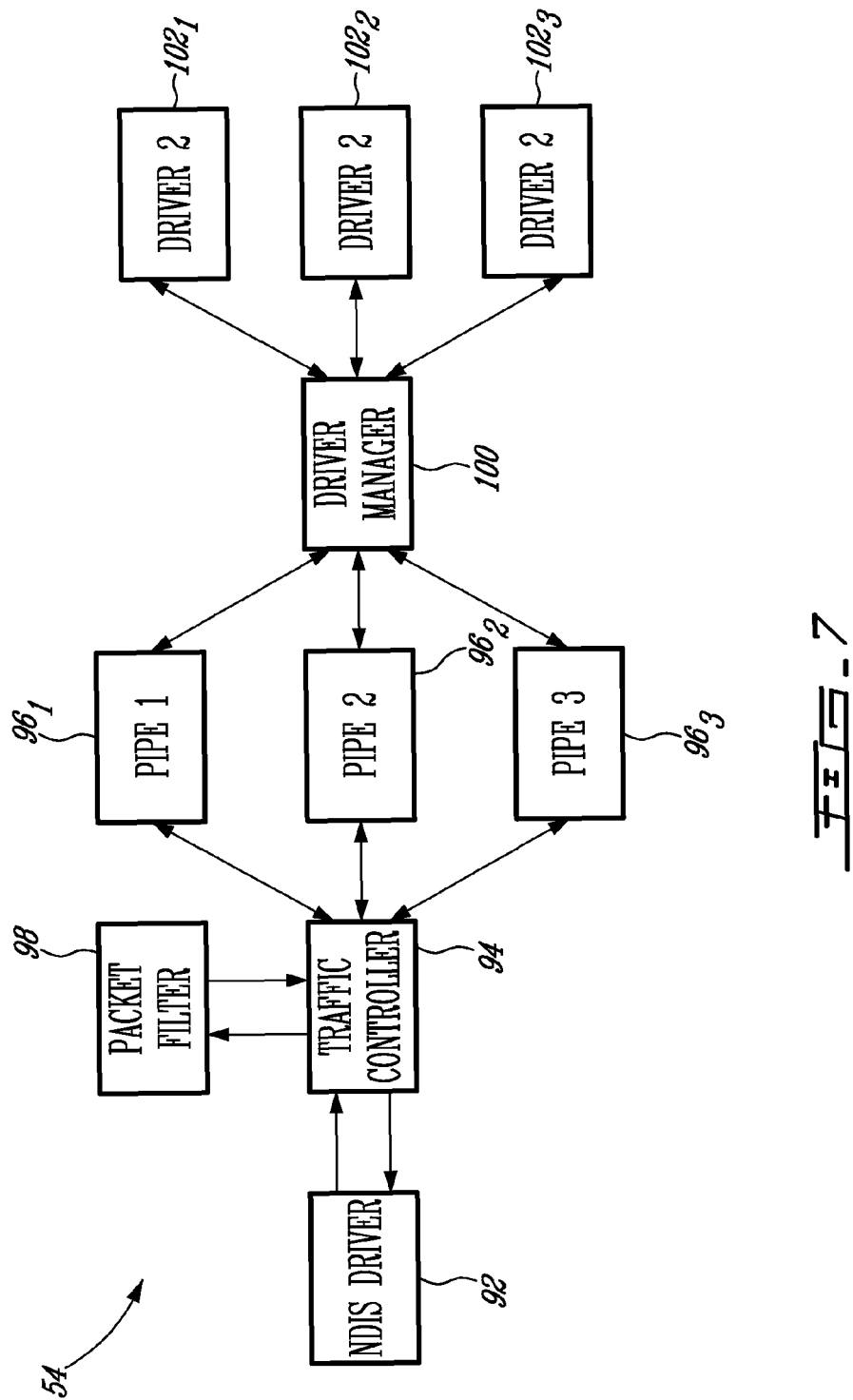
FIG. 7 is a schematic diagram of a remote client of the critical communications network of FIG. 4 in accordance with an illustrative embodiment of the present invention.

Referring now to FIG. 7 in addition to FIG. 6, except for the Client Registration Manager 82, IP Management module 84, and Session Management module 86 discussed herein above and provided at the server side router 60 for processing the registration request of the remote client side router 54, both the remote client side router 54 and server side router 60 typically have a similar basic architecture. Indeed, the remote client side router 54 and the server side router 60 illustratively both comprise a device specific (NDIS) driver 92 at which network packets are received from local applications and a traffic controller 94 in communication with a plurality of roaming pipes as in $96_1$, $96_2$, $96_3$. Both the remote client side router 54 and server side router 60 further comprise a packet filter 98 and a driver manager 100 for routing traffic to one of a plurality of drivers as in $102_1$, $102_2$, $102_3$ for subsequent transmittal.

Referring back to FIG. 5 in addition to FIG. 7, a functional model of communication between a remote client side router 54 and a server side router 60, which is reciprocal to communication between the server side router 60 and the remote client side router 54, will now be described. TCP/IP network (IP) packets are illustratively automatically routed using the device specific driver 92 (e.g. a Network Driver Interface Specification, or NDIS, driver) supporting a virtual network interface card (VNIC), either by a driver hooked to the physical network connections or using the operating system IP routing mechanism (none shown). Packet traffic between the client application 4 and server application 18 is illustratively controlled by the traffic controller 94, which, using a set of predefined rules, permits or denies all such packet traffic to a corresponding one of the plurality of roaming pipes as in $96_1$, $96_2$, $96_3$. Indeed, each pipe as in $96_1$, $96_2$, $96_3$ receives packets attached to the tunnel 80 established between the remote client side router 54 and server side router 60.

A set of filtering rules, which is illustratively provided to a remote client side router 54 when the latter registers to the server side router 60 and is illustratively managed by the packet filter 100, informs the traffic controller 94 which pipe as in $96_1$, $96_2$, $96_3$ the network packets should be sent to. The filtering rules thus may include a complete listing of parameters (e.g. port number, destination IP address, etc.) assigned to each pipe as in $96_1$, $96_2$, $96_3$ and according to such rules, the network packet is either directed to the appropriate destination pipe as in $96_1$, or simply dropped or rejected. In particular, a filtering rule defines a set of criteria corresponding to one or more attributes of the network packet, such as the type of protocol used, destination address and port, application name or type, Quality of Service (QoS) requested for transmitting the packet, or to parts of the network packet contents. A filtering rule can also be a composite of rules (e.g. directing every UDP or TCP packet to a specific pipe) or may be active only at a specific time or date span. When a network packet is filtered, the packet filter 98 illustratively tests each filtering rule until one matches the provided attributes of the network packet with all remaining filtering rules being ignored. In order to provide for network packets where no filtering rule can be applied, at least one default filtering rule may be provided.

Still referring to FIG. 7 in addition to FIG. 5, once the packet has been directed to a given pipe $96_1$, the driver manager 100 checks the roaming profile (not shown) associated with the pipe $96_1$ in order to distribute the received packet to the appropriate driver $102_1$ from the plurality of drivers as in $102_1$, $102_2$, $102_3$ for subsequent routing to the appropriate network (reference $40_1$ in FIG. 4). The driver manager 100 is illustratively responsible for managing data flow between each pipe as in $96_1$, $96_2$, $96_3$ and the corresponding communication drivers as in $102_1$, $102_2$, $102_3$ using the pipe's roaming profile. For this purpose, the driver manager 100 notifies that a given roaming pattern has changed, i.e. whether the drivers as in $102_1$, $102_2$, $102_3$ are available or not, so that the client 4 may accordingly choose a network protocol handler (reference 106 in FIG. 8) based on which networks (references $40_1$, $40_2$, $40_3$, $40_4$ in FIG. 4) are available. It is further possible to define a level of importance associated with each network as in $40_1$, $40_2$, $40_3$, $40_4$ by assigning a level of priority to a given pipe as in $96_1$, $96_2$, $96_3$. As a result, a network $40_1$ may be assigned a higher priority than another network $40_2$ based on particular needs and it also becomes possible to manage which ones of the networks as in $40_1$, $40_2$, $40_3$, $40_4$ are allowed to transmit to a given destination IP address. For example, a slower one of the networks as in $40_1$, $40_2$, $40_3$, $40_4$ may be denied access to a particular server application 18. Also, it becomes possible to limit which destination ports can use specific networks as in $40_1$, $40_2$, $40_3$, $40_4$. For example, transfers to a File Transfer Protocol (FTP) port over a slower one of the networks as in $40_1$, $40_2$, $40_3$, $40_4$ may be forbidden. In addition, the present invention provides the ability to decide which application is allowed to communicate over which networks as in $40_1$, $40_2$, $40_3$, $40_4$. For example, report management software may be allowed to always use the fastest network available.

Figure 8:
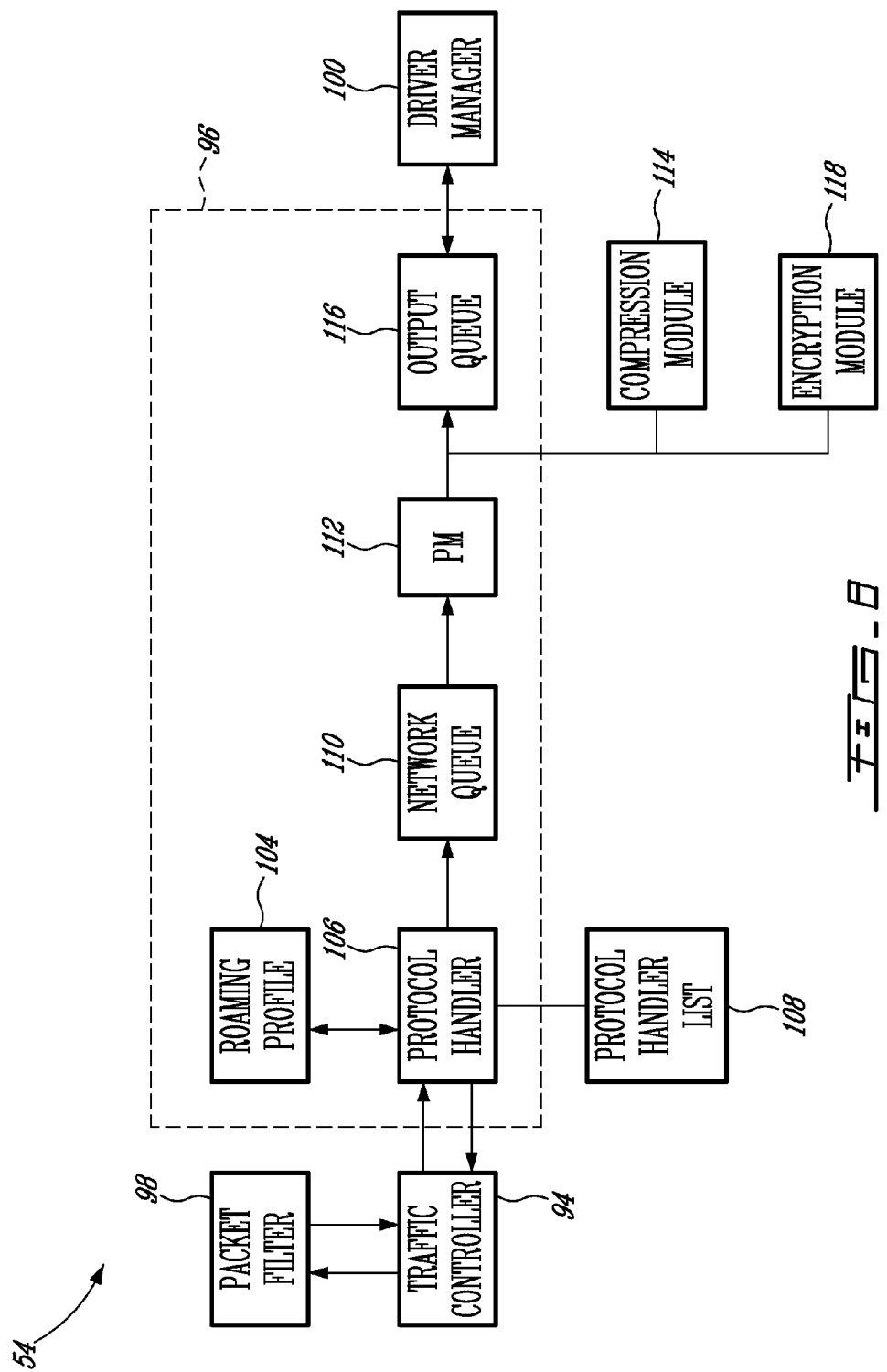
FIG. 8 is a schematic diagram of a roaming pipe of the remote client of FIG. 7.

Referring now to FIG. 8 in addition to FIG. 5, each pipe as in 96 is assigned a roaming profile 104, which consists of a set of rules used to define how a pipe 96 can transmit and receive data packets from a single communication driver (e.g. reference $102_1$ in FIG. 7) out of all available communication drivers $102_1$, $102_2$, $102_3$. Each roaming profile 104 illustratively maintains its current state as of which driver as in $102_1$, $102_2$, $102_3$ is used. In particular, the roaming profile 104 guides the driver manager 100 in the choice of the most suitable driver $102_1$ to be used, as well as by which rule another driver $102_2$ or $102_3$ may be used, in which case the driver manager 100 will update the state of the roaming profile 104. Once a network packet is received at the traffic controller 94, the packet is transferred to a protocol handler list 108, which determines if an already opened protocol handler 106 (i.e. an existing communication channel between a source application running locally and a destination application running remotely) is available to which the network packet may be sent. If no existing protocol handler 106 associated with the source and destination of the network packet is found, the network packet is returned to the traffic controller 94, which queries the packet filter 98 to find an appropriate pipe $96_1$ in which a new protocol handler 100 could be created. As discussed above, a filtering rule set, which defines which server application 18 matches the criteria to be used by a pipe 96, is illustratively used to find the corresponding pipe 96. Once determined, the packet is sent to the appropriate pipe 96 for creation of a new protocol handler 106. The traffic controller 94 then sends the network packet to the protocol handler 106 (whether new or existing), with the protocol handler 106 illustratively managing its own state depending on the type of protocol being used. In order to optimize the overall TCP performance, illustratively only SYN control packets are used to determine the pipe $96_1$ in which a protocol handler 106 should be created whereas other TCP packets are dropped if no corresponding protocol handler 106 exists. The time before closing a given protocol handler 100 may be set to vary based on the roaming profile 104 associated with of a given pipe $96_1$.

Still referring to FIG. 8 in addition to FIG. 5, the protocol handler 106 subsequently queues the network packet in a network queue 110, and informs its pipe $96_1$ that a packet is ready for transmission. Internally, the pipe $96_1$ which needs the data, illustratively queries using a packet manager (PM) 112 each protocol handler 106 having pending network packets for a data block having a predetermined length, the data block being retrieved from the network queue 110, compresses the data using a compression module 114, and queues the compressed data into data packets in an output queue 116. In particular, as the data to be transferred is typically textual, significant reductions in the amount of data to be transferred can be achieved by compressing the data using one of a number of suitable compression techniques or algorithms, for example $3^{rd}$-Order Arithmetic, Z-Lib, RLE or LZW. Each data packet is also optionally encrypted by an encryption module 118 illustratively using the tunnel cipher. The use of encryption ensures that all the transmitted data, which can typically be intercepted by parties other than the intended recipient(s), remains secure. The encrypted data packets are then illustratively encapsulated in a format compatible with the driver manager 94 for transmission thereto.

Still referring to FIG. 8 in addition to FIG. 5, the pipe 90 at the packet manager 112 then informs the driver manager 100 that data packets are ready for transmission. The driver manager 100 illustratively receives such notifications from all pipes as in $96_1$, $96_2$, $96_3$ and for each pipe as in $96_1$ validates whether a driver as in $102_1$ is ready to send the data packets by checking the roaming profile 104 of the pipe $96_1$. It should be noted that in addition to informing that data packets are ready for transmission, the packet manager 112 is further illustratively used to reconstruct data blocks or streams and order packets (e.g. retrieved from the network queue 110) for transmission thereof. For instance, if a given packet (e.g. packet number 3) of a stream is missing, the packet manager 112 will retransmit the missing packet to ensure that the subsequently received stream is adequate. In this regard, every data packet is identified and packet manager 112 illustratively implements a mechanism similar to a TCP/IP sliding window. The received packets are acknowledged after a certain quantity of packets or a specified reception time out have been received. A list of missing packets is also provided. The sender will then resend the missing packets and wait for another acknowledgement from the peer before deleting the packets from its transmission queue.

Still referring to FIG. 8 in addition to FIG. 5, the driver manager 100 illustratively uses a scheduling mechanism to control which data packet from which pipe from the plurality of pipes as in $96_1$, $96_2$, $96_3$ should be transmitted to a corresponding communication driver from the plurality of drivers (references $102_1$, $102_2$, $102_3$ in FIG. 7). In particular, the scheduling mechanism is mainly responsible for scheduling the transmission of data packets generated by the roaming pipes as in $96_1$, $96_2$, $96_3$ to the corresponding drivers as in $102_1$, $102_2$, $102_3$. As each driver as in $102_1$, $102_2$, $102_3$ may have its own acknowledgement mechanism, it is desirable to manage the communication protocol between the driver manager 100 and the drivers as in $102_1$, $102_2$, $102_3$. For instance, some drivers as in $102_1$, $102_2$, $102_3$ may accept transmission of multiple data packets with only negative acknowledgement when they get overloaded whereas other drivers as in $102_1$, $102_2$, $102_3$ may accept only one data packet at a time with a full handshaking with the driver's radio modem (reference 56 in FIGS. 4 and 5) or communication network (reference $40_1$ in FIG. 4) prior to sending a subsequent data packet. Since multiple pipes as in $96_1$, $96_2$, $96_3$ may request to send data packets to the same driver as in $102_1$, the scheduling mechanism implemented by the driver manager 100 is therefore responsible for handling the complex task of sending data packets from pipes as in $96_1$, $96_2$, $96_3$ to the appropriate driver as in $102_1$ at the appropriate time.

Still referring to FIG. 8 in addition to FIG. 5, the driver manager 100 also takes care of the communication driver flow control so as to neither overload nor underuse the drivers (references $102_1$, $102_2$, $102_3$ in FIG. 7). Since multiple pipes as in $96_1$, $96_2$, $96_3$ may try to transmit to a same communication driver as in $102_1$, the driver manager 94 is illustratively mainly responsible for controlling which pipes as in $96_1$, $96_2$, $96_3$ have the highest priority.

Referring back to FIG. 6 in addition to FIG. 8, when the driver manager 100 sends a data packet to a driver $102_1$, the driver $102_1$ further frames the data packet with its own protocol to be transmitted on a communication network $40_1$. At the server side, the server side router 60, whose structure is similar to that of the remote client side router 54 as mentioned herein above, then receives data packets from a corresponding communication driver $102_1$, which extracts the data packet from the received packet by removing its protocol framing. The driver $102_1$ then sends the extracted data packet to the server's driver manager 100, which determines to which client object (reference $88_1$ in FIG. 6) the packet is dedicated to. The server's driver manager 94 then sends the data packet to the corresponding client object $88_1$, which then determines which pipe as in $96_1$ the packet should be sent to. The corresponding pipe $96_1$ will then queue the received data packets and restore the original network packets by decrypting and uncompressing the data packets as necessary, and sending the resulting data to the appropriate protocol handler 106. If the data contains a request to open a new protocol handler 106, the pipe $96_1$ creates a new protocol handler 106 and then sends the data to the protocol handler 106. As mentioned herein above, the protocol handler 106 is responsible for its own state. In particular, if the received data is complete or completes previously received data, then a network packet is restored by the protocol handler 106. The network packet is then sent to the traffic controller 94 to be dispatched to the NDIS driver (reference 92 in FIG. 7), which, for example, routes the packet to a physical LAN in order to reach the intended remote server application 18.

Referring back to FIG. 4, unlike prior art solutions, the system of the present invention advantageously enables the creation of a single tunnel (reference 80 in FIG. 5) between the remote client side router 54 and the server side router 60 while using multiple communication networks as in $40_1$, $40_2$, $40_3$, $40_4$ at the same time for enabling roaming of the applications between the networks as in $40_1$, $40_2$, $40_3$, $40_4$. Indeed, as mentioned herein above, as the applications (references 4, 18 in FIG. 5) are assigned a roaming pipe (reference 96 in FIG. 8) by the remote client side router 54 and server side router 60, it becomes possible to roam between the networks as in $40_1$, $40_2$, $40_3$, $40_4$ based on the availability of the latter. According to the present invention, based on the roaming profile (reference 104 in FIG. 8) of each roaming pipe 96 more than one communication network as in $40_1$, $40_2$, $40_3$, $40_4$ is usable at a given time. In this manner, local applications as in 4 for example, which necessitate the use of networks as in $40_1$, $40_2$, $40_3$, $40_4$ having a faster data transfer speed, are able to use public communication networks, (e.g. 3G and broadband networks), while local applications as in 4, which carry critical information and can operate at a lower speed, are routed to the most secure and reliable network as in $40_1$, $40_2$, $40_3$, $40_4$. Critical information can therefore safely reaches the recipient (i.e. remote application 18) with a reduced risk of being corrupted or intercepted by a third party.

Note that although the above illustrative embodiment has been described using the example of a nomadic/mobile subsystem and a ground system, in a particular embodiment the present invention can be used to facilitate communications between peer to peer systems, for example between a first nomadic/mobile subsystem and a second nomadic/mobile subsystem.

Although the present invention has been described hereinabove by way of specific embodiments thereof, it can be modified, without departing from the spirit and nature of the subject invention as defined in the appended claims.

The invention claimed is:

1. A system for enabling simultaneous transmission of mission critical data between first application pair and non-mission critical data between a second application pair, a first application of each application pair in a nomadic/mobile subsystem and a second application of each application pair in a ground subsystem, the system comprising:
  a first router within the nomadic/mobile subsystem, said first router interconnected with the first applications;
  a second router within the ground subsystem, said second router interconnected with the second applications;
  a mission critical communication network;
  at least one non-mission critical communication network, and
  a secure data transfer tunnel established between said first router and said second router, said tunnel comprising a plurality of communication pipes, a first one of said plurality of pipes having associated therewith said mission critical communication networks and a first filtering rule dictating that said pipe can be used to transmit mission critical data and at least a second one of said plurality of pipes having associated therewith at least one of said non-mission critical communication networks and a second filtering rule dictating that said pipe can be used to transmit non-mission critical data;
  wherein the mission critical data is transmitted between the first application pair via said first communication pipe at the same time as said non-mission critical data is transmitted between the second application pair via said second communication pipe.

2. The system of claim 1, wherein said first and second filtering rules each comprises a set of filtering rules, the data to be transmitted comprises a plurality of attributes and when said plurality of attributes complies with one of said sets of filtering rules, the transmission of the data between the application pair is assigned to a respective one of said pipes.

3. The system of claim 2, wherein said set of filtering rules comprises an application pair type.

4. The system of claim 2, wherein said set of filtering rules comprises a requested Quality of Service (QoS) of data transmission.

5. The system of claim 1, wherein each of said communication networks comprises a driver, and each of said plurality of pipes further comprises a roaming profile consisting of a set of rules defining how said pipe can transmit and receive data packets from at least one of said communication drivers.

6. The system of claim 1, wherein for a given one of said plurality of pipes said associated communication network and said filtering rule may change from time to time.

7. The system of claim 1, wherein said communication networks are selected from the group consisting of cellular, WiFi, satellite, DataTAC™ and wired networks.

8. The system of claim 1, wherein said first router is a client side router and said second router is a server side router.

9. A method for enabling transmission of mission critical data between a first pair of applications and non-mission critical data between a second pair of applications, a first application of each of the pairs of applications in a nomadic/mobile system and a second application of each of the pairs of applications in a ground system, the method comprising:
  providing a tunnel between the nomadic/mobile system and the ground system, said tunnel comprised of a plurality of communication pipes, a first one of said plurality of pipes having associated therewith a mission critical one of a plurality of different communication networks and a first filtering rule dictating that said pipe shall be used to transmit mission critical data and at least a second one of said plurality of pipes having associated therewith a non-mission critical communication network and a second filtering rule dictating that said pipe shall be used to transmit non-mission critical data;
  at said tunnel, receiving data for transmission between said first application pair and said second application pair;
  selecting said first pipe for transmitting the mission critical data between the first application pair;
  selecting said second one of said pipes for transmitting the non-mission critical data between said second application pair; and
  simultaneously transmitting said data between a given pair using said selected pipe.

10. The method of claim 9, wherein said first and second filtering rules each comprises a set of filtering rules, the data to be transmitted comprises a plurality of attributes and when said plurality of attributes complies with one of said sets of filtering rules, the transmission of the data between the application pair is assigned to a respective one of said pipes.

11. The method of claim 10, wherein said set of filtering rules comprises an application pair type.

12. The method of claim 10, wherein said set of filtering rules comprises a requested Quality of Service (QoS) of data transmission.

13. The method of claim 9, wherein for a given one of said plurality of pipes said associated communication network and said filtering rule may change from time to time.

14. The method of claim 9, wherein said plurality of communication networks are selected from the group consisting of cellular, WiFi, satellite, DataTAC™ and wired networks.

15. The method of claim 9, further comprising providing a first router in the nomadic/mobile system interconnected with the first applications of each of the application pairs and a second router in the ground system interconnected with the second applications of each of the application pairs and wherein said tunnel is provided between said first router and said second router.

16. The method of claim 15, wherein said first router is a client side router and said second router is a server side router.

17. A system for enabling simultaneous transmission of mission critical data between first application pair and non-mission critical data between a second application pair, a first of each application pair in a first nomadic/mobile subsystem and a second one of each application pair in a second nomadic/mobile subsystem, the system comprising:
  a first router within the first nomadic/mobile subsystem, said first router interconnected with the first application;
  a second router within the second nomadic/mobile subsystem, said second router interconnected with the second application;
  a mission critical communication network;
  at least one non-mission critical communication network, and
  a secure data transfer tunnel established between said first router and said second router, said tunnel comprising a plurality of communication pipes, a first one of said plurality of pipes having associated therewith said mission critical communication networks and first filtering rule dictating that said pipe can be used to transmit mission critical data and at least a second one of said plurality of communication pipes having associated therewith said non-mission critical communication network and a second filtering rule dictating that said pipe can be used to transmit non-mission critical data;
  wherein when the mission critical data is transmitted between the first application pair via said first communication pipe at the same time as said non-mission critical data is transmitted between the second application pair via said second communication pipe.

* * * * *